US012641630B2

(12) United States Patent
Ryu et al.

(10) Patent No.: US 12,641,630 B2
(45) Date of Patent: May 26, 2026

(54) CAPABILITY SIGNALING FOR A MULTIPLE PHYSICAL DOWNLINK SHARED CHANNEL SCHEDULING

(71) Applicant: QUALCOMM Incorporated, San Diego, CA (US)

(72) Inventors: Jae Ho Ryu, San Diego, CA (US); Lei Xiao, San Jose, CA (US); Jae Won Yoo, San Diego, CA (US); Sumant Jayaraman Iyer, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/456,868

(22) Filed: Aug. 28, 2023

(65) Prior Publication Data

US 2024/0172257 A1    May 23, 2024

Related U.S. Application Data

(60) Provisional application No. 63/384,398, filed on Nov. 18, 2022.

(51) Int. Cl.
| | |
|---|---|
| *H04W 72/51* | (2023.01) |
| *H04B 7/0452* | (2017.01) |
| *H04W 72/0446* | (2023.01) |
| *H04W 72/0453* | (2023.01) |
| *H04W 72/1273* | (2023.01) |
| *H04W 72/232* | (2023.01) |

(52) U.S. Cl.
CPC .......... *H04W 72/51* (2023.01); *H04B 7/0452* (2013.01); *H04W 72/0446* (2013.01); *H04W 72/0453* (2013.01); *H04W 72/1273* (2013.01); *H04W 72/232* (2023.01)

(58) Field of Classification Search
CPC ............. H04W 72/51; H04W 72/0453; H04W 72/232; H04W 72/0446; H04W 72/1273; H04B 7/045
See application file for complete search history.

(56) References Cited

U.S. PATENT DOCUMENTS

| | | | | |
|---|---|---|---|---|
| 2021/0051652 A1* | 2/2021 | Khoshnevisan | ........ | H04L 1/189 |
| 2021/0051701 A1* | 2/2021 | Fakoorian | ............. | H04W 72/23 |
| 2022/0104237 A1* | 3/2022 | Muruganathan | ...... | H04W 72/51 |

* cited by examiner

*Primary Examiner* — Brenda H Pham
(74) *Attorney, Agent, or Firm* — Harrity & Harrity LLP

(57) ABSTRACT

Various aspects of the present disclosure generally relate to wireless communication. A UE capability for a multiple physical downlink shared channel (PDSCH) scheduling may be signaled from a UE to a network entity. A UE capability signaling may indicate whether the UE supports a multiple PDSCH scheduling being associated with a same time domain resource allocation (TDRA) and/or a same frequency domain resource allocation (FDRA). The network node may schedule the multiple PDSCHs, via a multiple user multiple-input multiple-output (MU-MIMO) PDSCH scheduling or a multiple downlink control information (multi-DCI) multiple transmission reception point (mTRP) PDSCH scheduling, based at least in part on the UE capability signaling. The network entity may guarantee that co-scheduled PDSCHs have the same TDRA and/or the same FDRA, which may be based at least in part on the UE capability signaling.

8 Claims, 16 Drawing Sheets

1300 ⟶

```
┌────────────────────────────────────────────────┐
│ Transmit, to a network entity, a capability     │
│ signaling that indicates a UE capability for a  │
│ multiple physical downlink shared channel       │
│ (PDSCH) scheduling being associated with one    │
│ or more of a same time domain resource          │
│ allocation (TDRA) or a same frequency domain    │
│ resource allocation (FDRA)                      │
└────────────────────────────────────────────────┘
```
1310

```
┌────────────────────────────────────────────────┐
│ Receive, from the network entity, an indication │
│ of a scheduling of multiple PDSCHs, the multiple│
│ PDSCHs being associated with one or more of the │
│ same TDRA or the same FDRA based at least in    │
│ part on the capability signaling                │
└────────────────────────────────────────────────┘
```
1320

Overlapping resource allocation 406

UE 1 PDSCH 402

UE 2 PDSCH 404

400

Network Entity
(for example,
network node 110)

UE
120

802: Capability signaling indicating UE capability
for multiple PDSCH scheduling associated with
same TDRA and/or same FDRA 804: Indication of scheduling of multiple PDSCHs
based at least in part on capability signaling

800

1000

UE2
PDSCH
1004

UE1
PDSCH
1002

TRP2 PDSCH 1104

TRP1 PDSCH 1102

1100

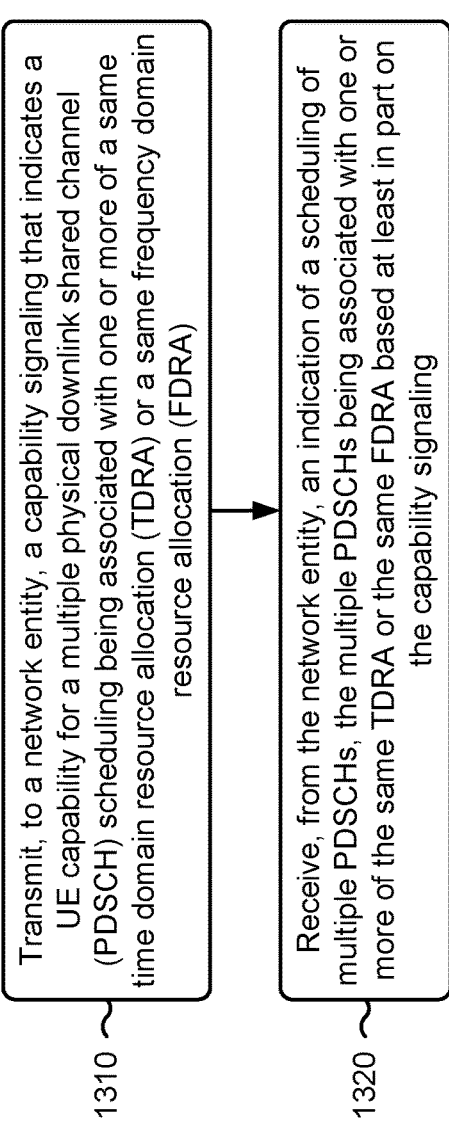

1310 Transmit, to a network entity, a capability signaling that indicates a UE capability for a multiple physical downlink shared channel (PDSCH) scheduling being associated with one or more of a same time domain resource allocation (TDRA) or a same frequency domain resource allocation (FDRA)

1320 Receive, from the network entity, an indication of a scheduling of multiple PDSCHs, the multiple PDSCHs being associated with one or more of the same TDRA or the same FDRA based at least in part on the capability signaling

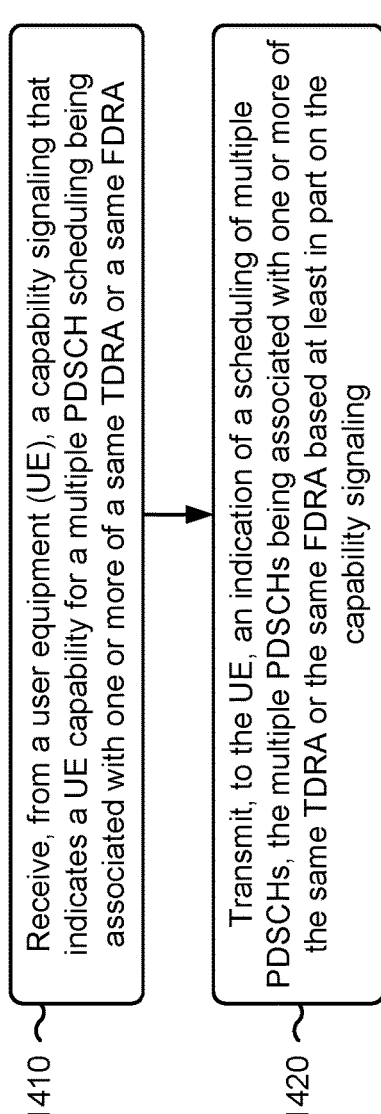

1410 Receive, from a user equipment (UE), a capability signaling that indicates a UE capability for a multiple PDSCH scheduling being associated with one or more of a same TDRA or a same FDRA 1420 Transmit, to the UE, an indication of a scheduling of multiple PDSCHs, the multiple PDSCHs being associated with one or more of the same TDRA or the same FDRA based at least in part on the capability signaling

CAPABILITY SIGNALING FOR A MULTIPLE PHYSICAL DOWNLINK SHARED CHANNEL SCHEDULING

CROSS-REFERENCE TO RELATED APPLICATION

This Patent Applications claims priority to U.S. Provisional Patent Application No. 63/384,398, filed on Nov. 18, 2022, entitled "CAPABILITY SIGNALING FOR A MULTIPLE PHYSICAL DOWNLINK SHARED CHANNEL SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for capability signaling for a multiple physical downlink shared channel (PDSCH) scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A UE may receive signals in a first physical downlink shared channel (PDSCH) associated with a first resource allocation. The first resource allocation may partially overlap with a second resource allocation associated with a second PDSCH, where the partial overlap may be in a time domain and/or in a frequency domain. In other words, a portion of the first PDSCH may be interfered with a portion of the second PDSCH. The first PDSCH and the second PDSCH may be associated with two separate UEs. Alternatively, the first PDSCH and the second PDSCH may be associated with the same UE but with two different transmission reception points (TRPs). The UE may use a first demodulation scheme for a non-overlapping region associated with the first PDSCH. The UE may use a second demodulation scheme for an overlapping region associated with the first PDSCH. The UE may determine the non-overlapping region and the overlapping region based at least in part on a demodulation reference signal (DMRS) associated with the first PDSCH. However, in some cases, when using the DMRS, the UE may not correctly identify boundaries for the non-overlapping region and the overlapping region, respectively. As a result, the UE may mistakenly use the second demodulation scheme for a portion of the non-overlapping region, instead of using the first demodulation scheme, which may result in a performance degradation at the UE.

SUMMARY

Some aspects described herein relate to a user equipment (UE) for wireless communication. The UE may include at least one memory and at least one processor communicatively coupled with the at least one memory. The at least one processor may be operable to cause the UE to transmit, to a network entity, a capability signaling that indicates a UE capability for a multiple physical downlink shared channel (PDSCH) scheduling being associated with one or more of a same time domain resource allocation (TDRA) or a same frequency domain resource allocation (FDRA). The at least one processor may be operable to cause the UE to receive, from the network entity, an indication of a scheduling of multiple PDSCHs, the multiple PDSCHs being associated with one or more of the same TDRA or the same FDRA based at least in part on the capability signaling.

Some aspects described herein relate to a network entity for wireless communication. The network entity may include at least one memory and at least one processor communicatively coupled with the at least one memory. The at least one processor may be operable to cause the network entity to receive, from a UE, a capability signaling that indicates a UE capability for a multiple PDSCH scheduling being associated with one or more of a same TDRA or a same FDRA. The at least one processor may be operable to cause the network entity to transmit, to the UE, an indication of a scheduling of multiple PDSCHs, the multiple PDSCHs being associated with one or more of the same TDRA or the same FDRA based at least in part on the capability signaling.

Some aspects described herein relate to a method of wireless communication performed by a UE. The method may include transmitting, to a network entity, a capability signaling that indicates a UE capability for a multiple PDSCH scheduling being associated with one or more of a same TDRA or a same FDRA. The method may include receiving, from the network entity, an indication of a scheduling of multiple PDSCHs, the multiple PDSCHs being associated with one or more of the same TDRA or the same FDRA based at least in part on the capability signaling.

Some aspects described herein relate to a method of wireless communication performed by a network entity. The method may include receiving, from a UE, a capability signaling that indicates a UE capability for a multiple PDSCH scheduling being associated with one or more of a same TDRA or a same FDRA. The method may include transmitting, to the UE, an indication of a scheduling of multiple PDSCHs, the multiple PDSCHs being associated with one or more of the same TDRA or the same FDRA based at least in part on the capability signaling.

Some aspects described herein relate to a non-transitory computer-readable medium that stores a set of instructions for wireless communication by a UE. The set of instructions, when executed by one or more processors of the UE, may cause the UE to transmit, to a network entity, a capability signaling that indicates a UE capability for a multiple PDSCH scheduling being associated with one or more of a same TDRA or a same FDRA. The set of instructions, when executed by one or more processors of the UE, may cause the UE to receive, from the network entity, an indication of a scheduling of multiple PDSCHs, the multiple PDSCHs being associated with one or more of the same TDRA or the same FDRA based at least in part on the capability signaling.

Some aspects described herein relate to a non-transitory computer-readable medium that stores a set of instructions for wireless communication by a network entity. The set of instructions, when executed by one or more processors of the network entity, may cause the network entity to receive, from a UE, a capability signaling that indicates a UE capability for a multiple PDSCH scheduling being associated with one or more of a same TDRA or a same FDRA. The set of instructions, when executed by one or more processors of the network entity, may cause the network entity to transmit, to the UE, an indication of a scheduling of multiple PDSCHs, the multiple PDSCHs being associated with one or more of the same TDRA or the same FDRA based at least in part on the capability signaling.

Some aspects described herein relate to an apparatus for wireless communication. The apparatus may include means for transmitting, to a network entity, a capability signaling that indicates a UE capability for a multiple PDSCH scheduling being associated with one or more of a same TDRA or a same FDRA. The apparatus may include means for receiving, from the network entity, an indication of a scheduling of multiple PDSCHs, the multiple PDSCHs being associated with one or more of the same TDRA or the same FDRA based at least in part on the capability signaling.

Some aspects described herein relate to an apparatus for wireless communication. The apparatus may include means for receiving, from a UE, a capability signaling that indicates a UE capability for a multiple PDSCH scheduling being associated with one or more of a same TDRA or a same FDRA. The apparatus may include means for transmitting, to the UE, an indication of a scheduling of multiple PDSCHs, the multiple PDSCHs being associated with one or more of the same TDRA or the same FDRA based at least in part on the capability signaling.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 13 is a flowchart illustrating an example process performed, for example, by a UE in accordance with the present disclosure.

FIG. 14 is a flowchart illustrating an example process performed, for example, by a network node in accordance with the present disclosure.

DETAILED DESCRIPTION

Figure 1:
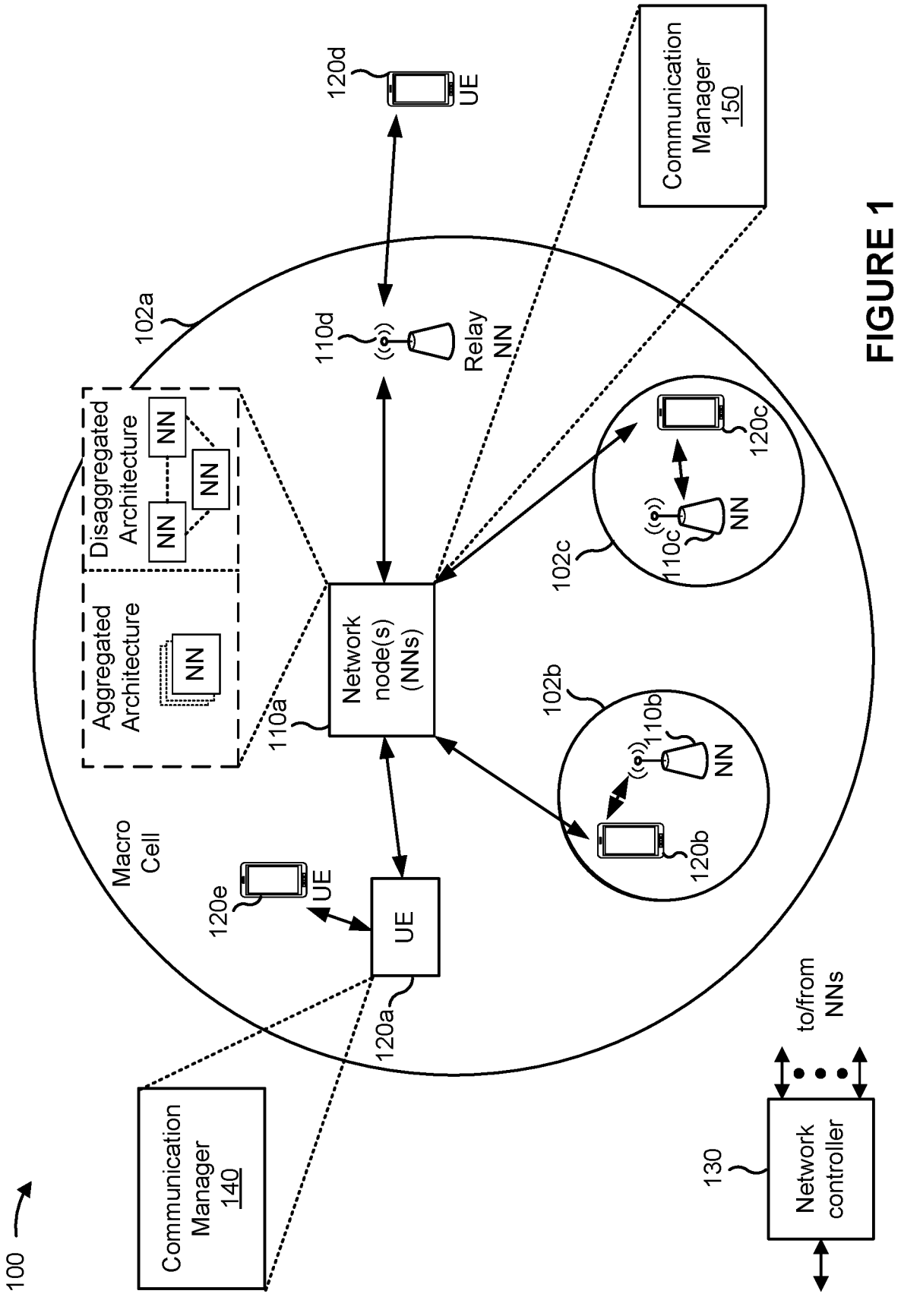
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to signaling a UE capability for a multiple physical downlink shared channel (PDSCH) scheduling. A network entity may schedule multiple PDSCHs for one or more UEs. In a multiple user multiple-input multiple-output (MU-MIMO) PDSCH scheduling, the network entity may schedule different PDSCHs for different UEs. In a multiple downlink control information (multi-DCI) multiple transmission reception point (mTRP) PDSCH scheduling, the network entity may schedule different PDSCHs via different TRPs for the same UE. The UE may transmit, to the network node, UE capability signaling to indicate whether the UE supports a multiple PDSCH scheduling being associated with the same time domain resource allocation (TDRA) and/or the same frequency domain resource allocation (FDRA). The UE capability signaling may indicate whether the UE supports multiple PDSCHs being scheduled to have the same TDRA and/or the same FDRA with respect to each other. In some aspects, the UE capability signaling may indicate a MU-MIMO PDSCH scheduling restriction. For example, the UE capability signaling may indicate that MU-MIMO PDSCHs scheduled by the network entity in accordance with the MU-MIMO PDSCH scheduling should have the same TDRA and/or the same FDRA. In some aspects, the UE capability signaling may indicate a multi-DCI mTRP PDSCH scheduling restriction. For example, the UE capability signaling may indicate that multiple PDSCHs scheduled by the network entity in accordance with the multi-DCI mTRP PDSCH scheduling should have the same TDRA. The network entity may receive the UE capability signaling. The network node may schedule the multiple PDSCHs, via the MU-MIMO PDSCH scheduling or the multi-DCI mTRP PDSCH scheduling, based at least in part on the UE capability signaling. For example, the network entity may guarantee that co-scheduled PDSCHs have the same TDRA and/or the same FDRA, which may be based at least in part on the UE capability signaling.

Particular aspects of the subject matter described in this disclosure can be implemented to realize one or more of the following potential advantages. In some examples, the described techniques can be used to reduce UE complexity, reduce UE power consumption, and/or improve UE performance. The network entity may schedule the multiple PDSCHs in accordance with the UE capability signaling.

The network entity may not schedule multiple PDSCHs that conflict with a UE capability, as indicated in the UE capability signaling. As a result, the UE may not need to handle different hypotheses regarding the presence of interfering layers on different symbols and resource groups. Otherwise, the UE would need to form different hypotheses for multiple PDSCHs not overlapping, overlapping in a time domain, overlapping in a frequency domain, and overlapping in both the time domain and the frequency domain, which would unnecessarily increase UE complexity, increase UE power consumption, and reduce UE performance. Further, the network entity may be able to accurately identify overlapping regions associated with the multiple PDSCHs, because the multiple PDSCHs may be scheduled by the network entity in accordance with the UE capability signaling. The UE may be able to accurately use different demodulation schemes for different regions. For example, the UE may use different demodulation schemes for overlapping regions versus non-overlapping regions. Since the network entity may schedule the multiple PDSCHs based at least in part on the UE capability signaling, the UE may be less likely to use an inappropriate demodulation scheme for a certain region, which would otherwise degrade a UE performance.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120c) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1

(52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave." if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a UE (for example, UE 120) may include a communication manager 140. As described in more detail elsewhere herein, the communication manager 140 may transmit, to a network entity, a capability signaling that indicates a UE capability for a multiple PDSCH scheduling being associated with one or more of a same TDRA or a same FDRA; and receive, from the network entity, an indication of a scheduling of multiple PDSCHs, the multiple PDSCHs being associated with one or more of the same TDRA or the same FDRA based at least in part on the capability signaling. Additionally, or alternatively, the communication manager 140 may perform one or more other operations described herein.

In some aspects, a network entity (for example, network node 110) may include a communication manager 150. As described in more detail elsewhere herein, the communication manager 150 may receive, from a UE, a capability signaling that indicates a UE capability for a multiple PDSCH scheduling being associated with one or more of a same TDRA or a same FDRA; and transmit, to the UE, an indication of a scheduling of multiple PDSCHs, the multiple PDSCHs being associated with one or more of the same TDRA or the same FDRA based at least in part on the capability signaling. Additionally, or alternatively, the communication manager 150 may perform one or more other operations described herein.

Figure 2:
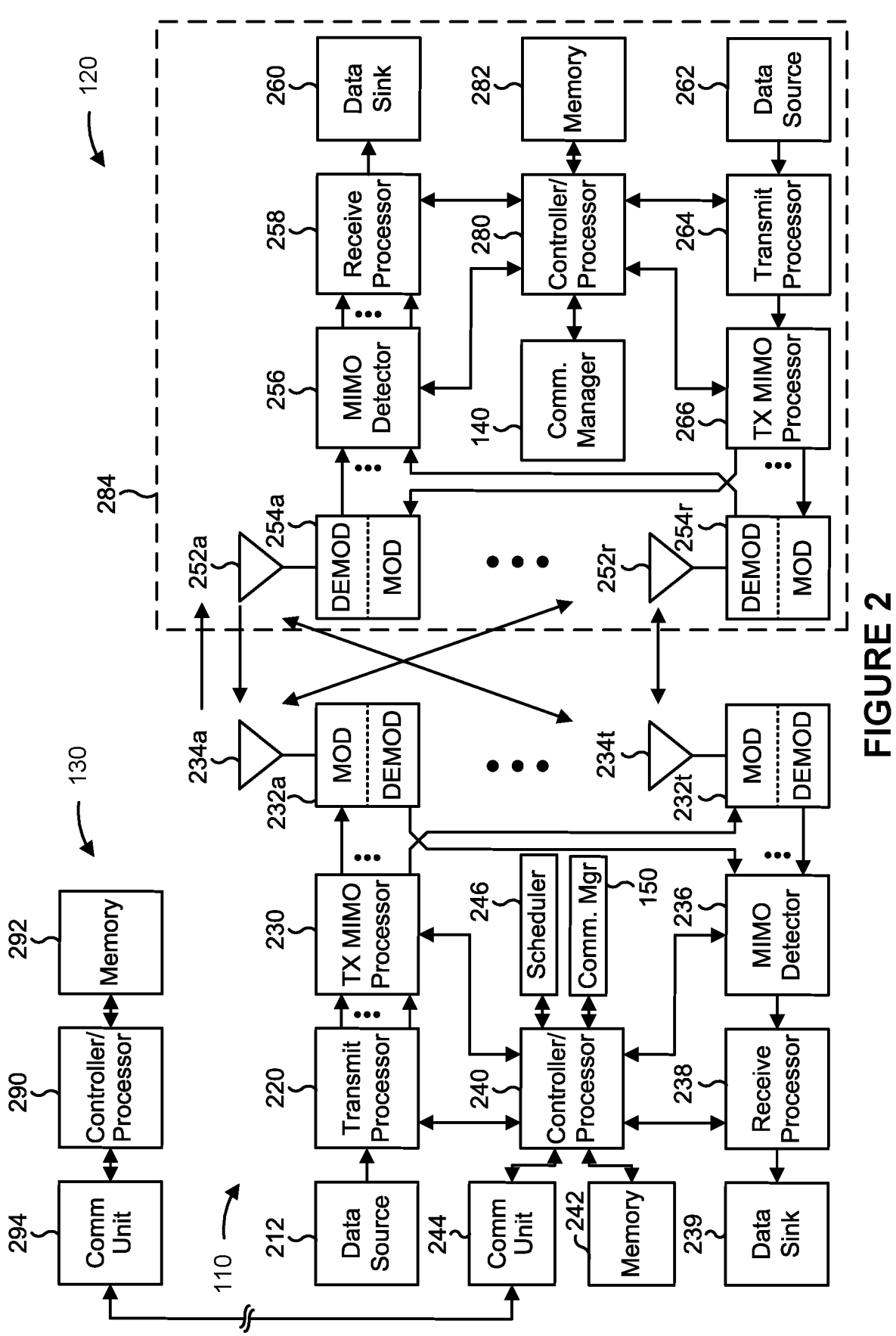
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with capability signaling for a multiple PDSCH scheduling, as described in more detail elsewhere herein. For example, the controller/processor 240 of the network node 110, the controller/processor 280 of the UE 120, or any other component(s) of FIG. 2 may perform or direct operations of, for example, process 1300 of FIG. 13, process 1400 of FIG. 14, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1300 of FIG. 13, process 1400 of FIG. 14, or other processes as described herein. In some examples, executing instructions may include running the instructions, converting the instructions, compiling the instructions, or interpreting the instructions, among other examples.

In some aspects, a UE (for example, UE 120) includes means for transmitting, to a network entity, a capability signaling that indicates a UE capability for a multiple PDSCH scheduling being associated with one or more of a same TDRA or a same FDRA; and/or means for receiving, from the network entity, an indication of a scheduling of multiple PDSCHs, the multiple PDSCHs being associated with one or more of the same TDRA or the same FDRA based at least in part on the capability signaling. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (for example, network node 110) includes means for receiving, from a UE, a capability signaling that indicates a UE capability for a multiple PDSCH scheduling being associated with one or more of a same TDRA or a same FDRA; and/or means for transmitting, to the UE, an indication of a scheduling of multiple PDSCHs, the multiple PDSCHs being associated with one or more of the same TDRA or the same FDRA based at least in part on the capability signaling. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
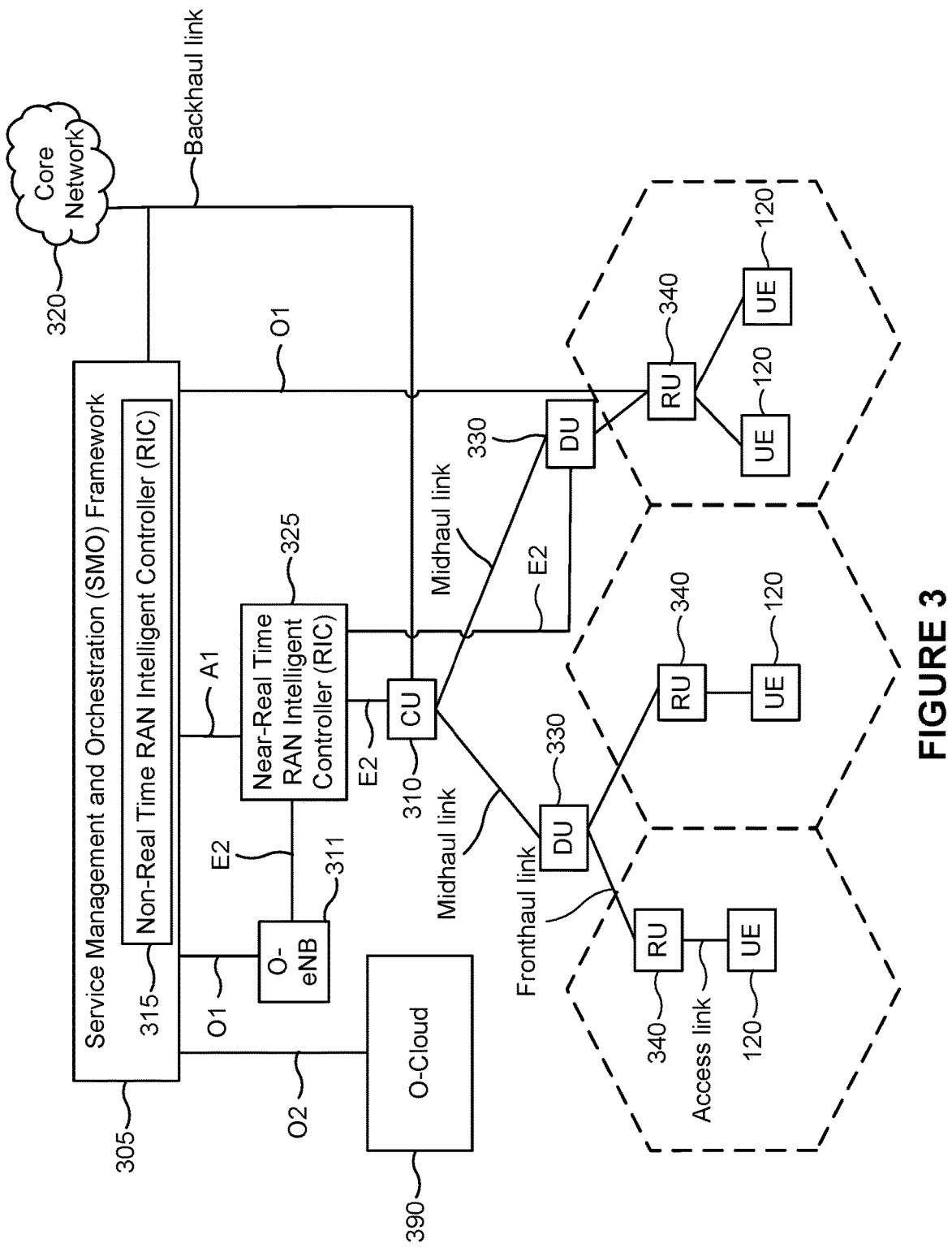
FIG. 3 is a diagram illustrating an example disaggregated base station architecture 300 in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), and/or control plane functionality (for example, Central Unit—Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

An NR PDSCH scheduling may support an MU-MIMO scheduling. Separate PDSCHs may be scheduled for multiple UEs during an MU-MIMO scheduling. A network entity may use an aligned DMRS configuration for the multiple UEs during the MU-MIMO scheduling. A DMRS configuration may include a DMRS type (dmrs-Type) parameter, a DMRS additional position (dmrs-Additional-Position) parameter, and/or a maximum length (maxLength) parameter. When using the aligned DMRS configuration, a DMRS associated with one UE may be aligned with a DMRS associated with another UE. For example, the MU-MIMO scheduling may require the network entity to use the aligned DMRS configuration. The network entity may or may not use an aligned TDRA for co-scheduled PDSCHs during the MU-MIMO scheduling. The network entity may or may not use an aligned FDRA for co-scheduled PDSCHs during the MU-MIMO scheduling. For example, the MU-MIMO scheduling may require the network entity to use the aligned TDRA and/or the aligned FDRA for the co-scheduled PDSCHs. Further, co-scheduled MU-MIMO PDSCHs may have partial overlapping in a time domain and/or in a frequency domain.

Figure 4:
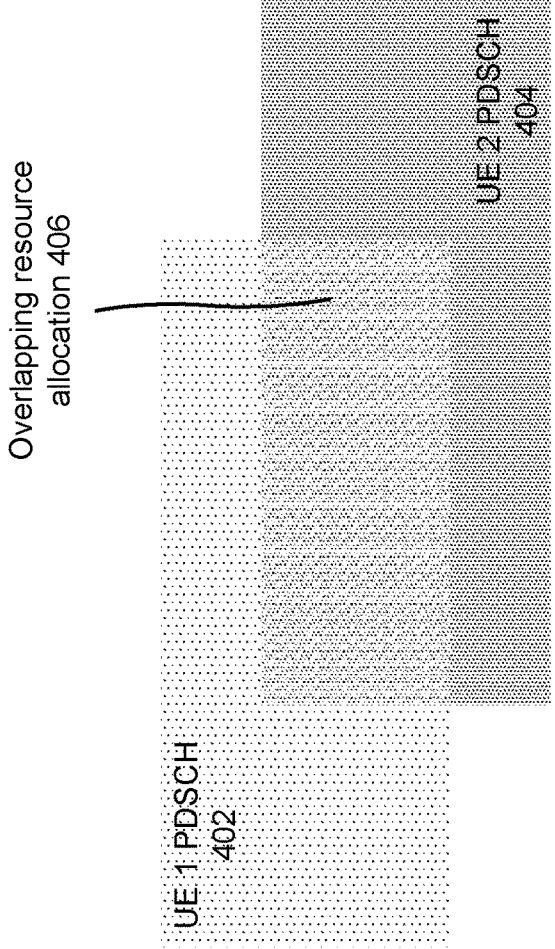
FIG. 4 is a diagram illustrating an example of multiple user multiple-input multiple-output (MU-MIMO) scheduling for a New Radio (NR) physical downlink shared channel (PDSCH) in accordance with the present disclosure.

FIG. 4 is a diagram illustrating an example 400 of an MU-MIMO scheduling for an NR PDSCH in accordance with the present disclosure.

As shown in FIG. 4, a UE 1 PDSCH 402 and a UE 2 PDSCH 404 may be co-scheduled MU-MIMO PDSCHs. The UE 1 PDSCH 402 may be a first PDSCH scheduled for a first UE. The UE 2 PDSCH 404 may be a second PDSCH scheduled for a second UE. The UE 1 PDSCH 402 may partially overlap in a time domain and/or in a frequency domain with the UE 2 PDSCH 404. An overlapping resource allocation 406 may correspond to an overlapping region between the UE 1 PDSCH 402 and the UE 2 PDSCH 404. In this example, the overlapping region may be in both the time domain and the frequency domain.

Figure 5:
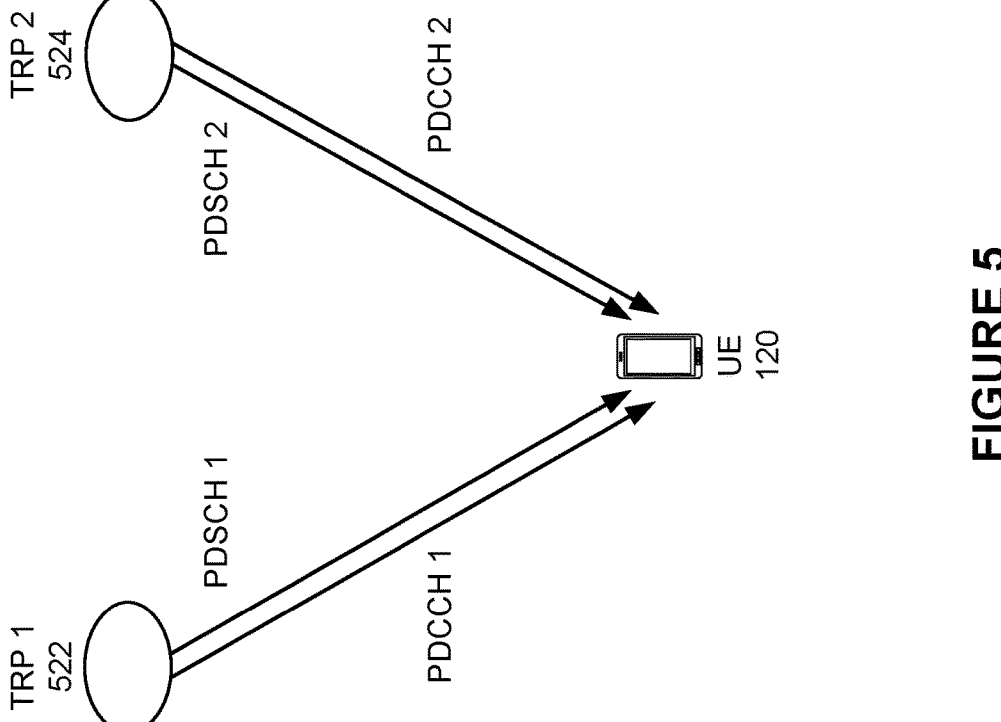
FIG. 5 is a diagram illustrating an example of a multiple downlink control information (DCI) (multi-DCI) multiple transmission reception point (mTRP) PDSCH scheduling in accordance with the present disclosure.

FIG. 5 is a diagram illustrating an example 500 of a multi-DCI mTRP PDSCH scheduling in accordance with the present disclosure.

As shown in FIG. 5, in a multi-DCI mTRP PDSCH scheduling, a UE 120 may receive signals via a first PDCCH (PDCCH 1) from a first TRP 522 (TRP 1) and signals via a second PDCCH (PDCCH 2) from a second TRP 524 (TRP 2). The first TRP 522 and the second TRP 524 may be associated with the same network entity (for example, network node 110), or the first TRP 522 and the second TRP 524 may be associated with separate network entities. For example, the first TRP 522 may be associated with a first network entity and the second TRP 524 may be associated with a second network entity. The first PDCCH may indicate a first DCI, which may schedule a first PDSCH (PDSCH 1). The UE may receive, from the first TRP 522, a first PDSCH transmission based at least in part on the first PDCCH. The second PDCCH may indicate a second DCI, which may schedule a second PDSCH (PDSCH 2). The UE may receive, from the second TRP 524, a second PDSCH transmission based at least in part on the second PDCCH.

Figure 6:
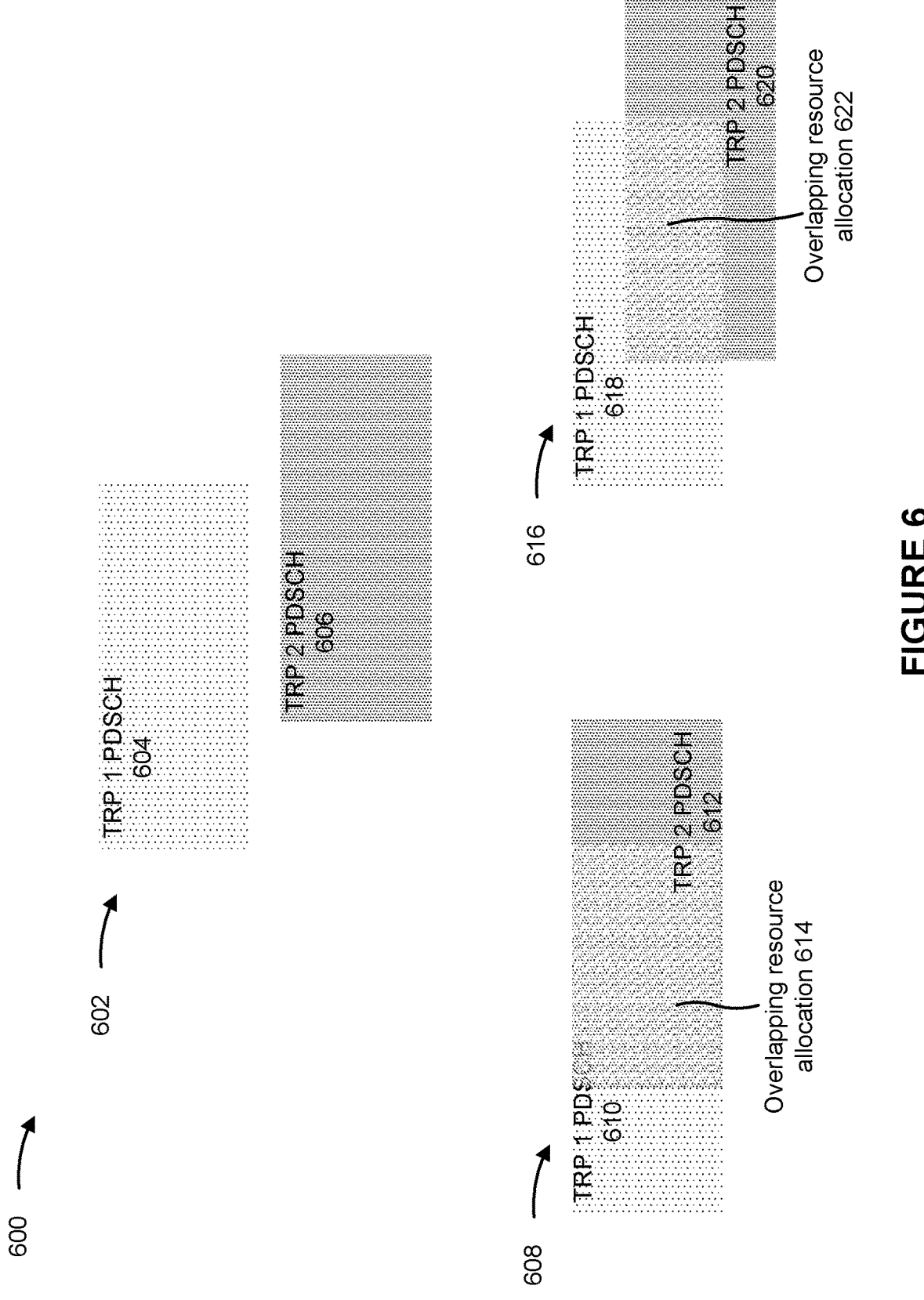
FIG. 6 is a diagram illustrating examples of multi-DCI mTRP PDSCH scheduling in accordance with the present disclosure.

FIG. 6 is a diagram illustrating examples 600 of multi-DCI mTRP PDSCH scheduling in accordance with the present disclosure.

In a multi-DCI mTRP PDSCH scheduling, a full or partial overlapping may be allowed in a time domain. No overlapping, a full overlapping, or a partial overlapping may be allowed in a frequency domain, subject to a UE capability.

As shown in 602, a TRP 1 PDSCH 604 may have a full or partial overlap with a TRP 2 PDSCH 606 in a time domain, and the TRP 1 PDSCH 604 may have no overlap with the TRP 2 PDSCH 606 in a frequency domain. The TRP 1 PDSCH 604 may be a PDSCH scheduled by a first TRP. The TRP 2 PDSCH 606 may be a PDSCH scheduled by a second TRP.

As shown in 608, a TRP 1 PDSCH 610 may have a full or partial overlap with a TRP 2 PDSCH 612 in a time domain, and the TRP 1 PDSCH 610 may have a full overlap with the TRP 2 PDSCH 612 in a frequency domain. An overlapping resource allocation 614 may correspond to an overlapping region between the TRP 1 PDSCH 610 and the TRP 2 PDSCH 612.

As shown in 616, a TRP 1 PDSCH 618 may have a full or partial overlap with a TRP 2 PDSCH 620 in a time domain, and the TRP 1 PDSCH 618 may have a partial overlap with the TRP 2 PDSCH 620 in a frequency domain. An overlapping resource allocation 622 may correspond to an overlapping region between the TRP 1 PDSCH 618 and the TRP 2 PDSCH 620.

A UE may receive signals via a first PDSCH associated with a first resource allocation. The first resource allocation may partially overlap with a second resource allocation associated with a second PDSCH, where the partial overlap may be in a time domain and/or in a frequency domain. In other words, a portion of the first PDSCH may be interfered with a portion of the second PDSCH. The first PDSCH and the second PDSCH may be associated with two separate UEs. Alternatively, the first PDSCH and the second PDSCH may be associated with the same UE but with two different TRPs. The UE may use a first demodulation scheme for a non-overlapping region associated with the first PDSCH. The UE may use a second demodulation scheme for an overlapping region associated with the first PDSCH. The UE may determine the non-overlapping region and the overlapping region based at least in part on a DMRS associated with the first PDSCH. However, in some cases, when using the DMRS, the UE may not correctly define boundaries for the non-overlapping region and the overlapping region, respectively. As a result, the UE may mistakenly use the second demodulation scheme for a portion of the non-overlapping region, instead of using the first demodulation scheme, which may result in a performance degradation at the UE.

In a demodulation implementation with a partial overlapping between PDSCHs, a UE acting as a receiver may handle different hypotheses regarding a presence of interfering layers on different OFDM symbols and physical resource groups (PRGs). The UE may handle different hypotheses for different scenarios, where a first scenario involves full/partial overlapping in a time domain and no overlapping in a frequency domain, a second scenario involves full/partial overlapping in the time domain and a full overlapping in the frequency domain, and a third scenario involves full/partial overlapping in the time domain and a partial overlapping in the frequency domain. An MU-MIMO scenario may involve an increased complexity for an MU-MIMO presence detection and a modulation order detection. An MU-MIMO and multi-DCI mTRP scenario may involve an increased complexity of demodulation configurations or combinations.

Figure 7:
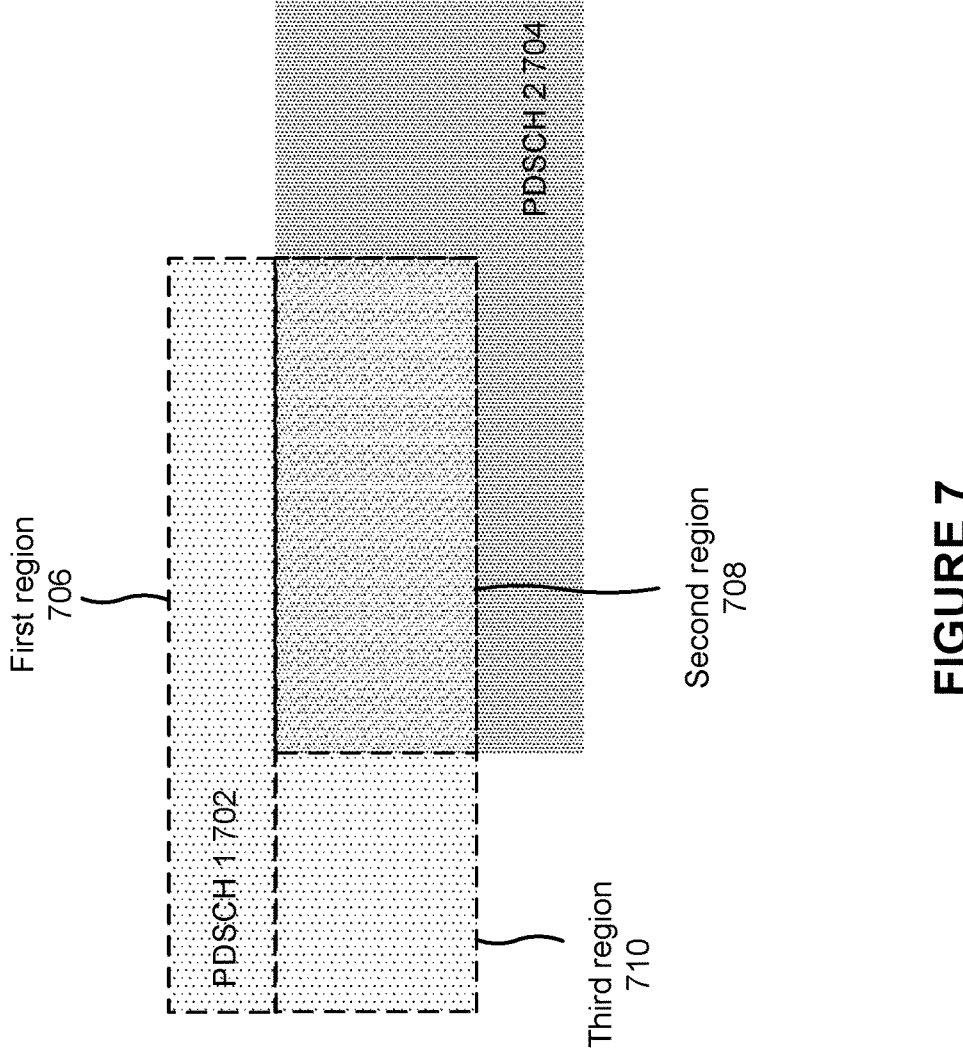
FIG. 7 is a diagram illustrating an example of demodulation schemes for different regions of a PDSCH in accordance with the present disclosure.

FIG. 7 is a diagram illustrating an example 700 of demodulation schemes for different regions of a PDSCH in accordance with the present disclosure.

As shown in FIG. 7, PDSCH 1 702 may be associated with a first resource allocation, and PDSCH 2 704 may be associated with a second resource allocation. PDSCH 1 702 may be a first PDSCH associated with a first UE, and PDSCH 2 704 may be a second PDSCH associated with a second UE. Alternatively, PDSCH 1 702 may be a first PDSCH associated with a UE, and PDSCH 2 704 may be a second PDSCH associated with the UE (for example, the same UE). The PDSCH 1 702 may be associated with a first TRP, and the PDSCH 2 704 may be associated with a second TRP. The first resource allocation may partially overlap with the second resource allocation, where the partial overlap may be in a time domain and/or in a frequency domain. In other words, a portion of PDSCH 1 702 may be interfered with a portion of PDSCH 2 704. In a first region 706, which may correspond to a non-overlapping region associated with PDSCH 1 702, a first demodulation scheme may be used. In a second region 708, which may correspond to an overlapping region associated with PDSCH 1 702, a second demodulation scheme may be used. The first region 706 (the non-overlapping region) and the second region 708 (the overlapping region) may be determined based at least in part on a DMRS associated with PDSCH 1 702. However, in some cases, when using the DMRS, the boundaries for non-overlapping regions versus overlapping regions may not be correctly defined. As a result, in a third region 710, which may correspond to a non-overlapping region associated with PDSCH 1 702, the second demodulation scheme may be mistakenly used instead of the first demodulation scheme, which may result in a UE performance degradation.

Various aspects relate generally to signaling a UE capability for a multiple PDSCH scheduling. A network entity may schedule multiple PDSCHs for one or more UEs. In an MU-MIMO PDSCH scheduling, the network entity may schedule different PDSCHs for different UEs. In a multi-DCI mTRP PDSCH scheduling, the network entity may schedule different PDSCHs via different TRPs for the same UE. The UE may transmit, to the network node, UE capability signaling to indicate whether the UE supports a multiple PDSCH scheduling being associated with the same TDRA and/or the same FDRA. The UE capability signaling may indicate whether the UE supports multiple PDSCHs being scheduled to have the same TDRA and/or the same FDRA with respect to each other. In some aspects, the UE capability signaling may indicate a MU-MIMO PDSCH scheduling restriction. For example, the UE capability signaling may indicate that MU-MIMO PDSCHs scheduled by the network entity in accordance with the MU-MIMO PDSCH scheduling should have the same TDRA and/or the same FDRA. In some aspects, the UE capability signaling may indicate a multi-DCI mTRP PDSCH scheduling restriction. For example, the UE capability signaling may indicate that multiple PDSCHs scheduled by the network entity in accordance with the multi-DCI mTRP PDSCH scheduling should have the same TDRA. The network entity may receive the UE capability signaling. The network node may schedule the multiple PDSCHs, via the MU-MIMO PDSCH scheduling or the multi-DCI mTRP PDSCH scheduling, based at least in part on the UE capability signaling. For example, the network entity may guarantee that co-scheduled PDSCHs have the same TDRA and/or the same FDRA, which may be based at least in part on the UE capability signaling.

Particular aspects of the subject matter described in this disclosure can be implemented to realize one or more of the following potential advantages. In some examples, the described techniques can be used to reduce UE complexity, reduce UE power consumption, and/or improve UE performance. The network entity may schedule the multiple PDSCHs in accordance with the UE capability signaling. The network entity may not schedule multiple PDSCHs that conflict with a UE capability, as indicated in the UE capability signaling. As a result, the UE may not need to handle different hypotheses regarding the presence of interfering layers on different symbols and resource groups. Otherwise, the UE would need to form different hypotheses for multiple PDSCHs not overlapping, overlapping in a time domain, overlapping in a frequency domain, and overlapping in both the time domain and the frequency domain, which would unnecessarily increase UE complexity, increase UE power consumption, and reduce UE performance. Further, the network entity may be able to accurately identify overlapping regions associated with the multiple PDSCHs, because the multiple PDSCHs may be scheduled by the network entity in accordance with the UE capability signaling. The UE may be able to accurately use different demodulation schemes for different regions. For example, the UE may use different demodulation schemes for overlapping regions versus non-overlapping regions. Since the network entity may schedule the multiple PDSCHs based at least in part on the UE capability signaling, the UE may be less likely to use an inappropriate demodulation scheme for a certain region, which would otherwise degrade a UE performance.

In some aspects, by scheduling the multiple PDSCHs in accordance with the UE capability signaling, the UE may avoid needing to handle different hypotheses regarding the presence of interfering layers on different OFDM symbols and PRGs. In the MU-MIMO PDSCH case, scheduling the multiple PDSCHs in accordance with the UE capability signaling may reduce UE complexity for an MU-MIMO presence detection and for a modulation order detection. In both the MU-MIMO PDSCH case and the multi-DCI mTRP case, scheduling the multiple PDSCHs in accordance with the UE capability signaling may reduce a complexity of demodulation configurations/combinations at the UE.

Figure 8:
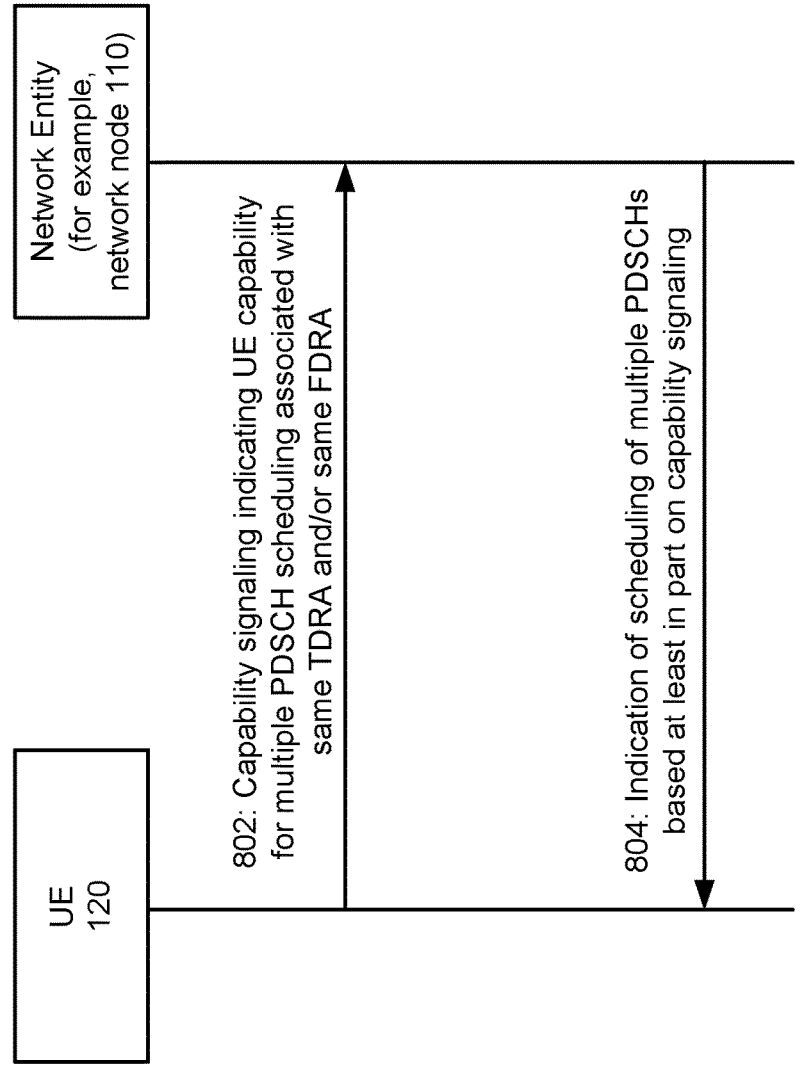
FIGS. 8-12 are diagrams illustrating examples associated with capability signaling for a multiple PDSCH scheduling in accordance with the present disclosure.

FIG. 8 is a diagram illustrating an example 800 associated with capability signaling for a multiple PDSCH scheduling in accordance with the present disclosure. As shown in FIG. 8, example 800 includes communication between a UE (for example, UE 120) and a network entity (for example, network node 110). In some aspects, the UE and the network entity may be included in a wireless network, such as wireless network 100.

In a first operation 802, the UE may transmit, to the network entity, a capability signaling that indicates a UE capability for a multiple PDSCH scheduling being associated with a same TDRA and/or a same FDRA. The multiple PDSCH scheduling may be a MU-MIMO PDSCH scheduling. Alternatively, the multiple PDSCH scheduling may be a multi-DCI mTRP PDSCH scheduling. The UE capability may indicate a multiple PDSCH scheduling restriction for the UE. For example, the UE capability may indicate that the multiple PDSCH scheduling should be restricted to the same TDRA and/or the same FDRA.

In a second operation 804, the UE may receive, from the network entity, an indication of a scheduling of multiple PDSCHs. The multiple PDSCHs may be associated with the same TDRA and/or the same FDRA based at least in part on the capability signaling. The multiple PDSCHs scheduled by the network entity may be restricted to the same TDRA and/or the same FDRA based at least in part on the capability signaling. Multiple PDSCHs that have the same TDRA may fully overlap in a time domain. Multiple PDSCHs that have the same FDRA may fully overlap in a frequency domain.

In some aspects, the multiple PDSCHs may include a first PDSCH and a second PDSCH. For the MU-MIMO PDSCH scheduling, the UE may be a first UE, the first PDSCH may be associated with the first UE, and the second PDSCH may be associated with a second UE. In other words, the first PDSCH and the second PDSCH may be associated with different UEs. For the multi-DCI mTRP PDSCH scheduling, the first PDSCH may be associated with a first TRP and the second PDSCH may be associated with a second TRP. For the multi-DCI mTRP PDSCH scheduling, the first PDSCH and the second PDSCH may both be associated with the same UE.

In some aspects, the capability signaling may indicate that the UE is capable of being scheduled with MU-MIMO PDSCHs having the same TDRA. The MU-MIMO PDSCHs scheduled by the network entity in accordance with the MU-MIMO PDSCH scheduling may be restricted to the same TDRA based at least in part on the capability signaling. The MU-MIMO PDSCHs scheduled by the network entity in accordance with the MU-MIMO PDSCH scheduling may not be restricted to the same FDRA based at least in part on the capability signaling. In some aspects, in a MU-MIMO PDSCH scheduling restriction, a UE capability for the MU-MIMO PDSCH scheduling with the same TDRA may be enabled. When the UE declares such a capability to the network entity, the network entity may guarantee that co-scheduled MU-MIMO PDSCHs have the same TDRA. The network entity may still select different FDRAs for co-scheduled MU-MIMO PDSCHs.

In some aspects, the capability signaling may indicate that the UE is capable of being scheduled with MU-MIMO PDSCHs having the same TDRA and the same FDRA. The MU-MIMO PDSCHs scheduled by the network entity in accordance with the MU-MIMO PDSCH scheduling may be restricted to the same TDRA and the same FDRA based at least in part on the capability signaling. In some aspects, in the MU-MIMO PDSCH scheduling restriction, a UE capability for the MU-MIMO PDSCH scheduling with the same TDRA and the same FDRA may be enabled. When the UE declares such a capability to the network entity, the network entity may guarantee that co-scheduled MU-MIMO PDSCHs have the same TDRA and the same FDRA.

In some aspects, the capability signaling may indicate that the UE is capable of being scheduled with multiple PDSCHs having the same TDRA. The multiple PDSCHs scheduled by the network entity in accordance with the multi-DCI mTRP PDSCH scheduling may be restricted to the same TDRA based at least in part on the capability signaling. The multiple PDSCHs scheduled by the network entity in accordance with the multi-DCI mTRP PDSCH scheduling may not be restricted to the same FDRA based at least in part on the capability signaling. In some aspects, in a multi-DCI mTRP PDSCH scheduling restriction, a UE capability for the multi-DCI mTRP PDSCH scheduling with the same TDRA may be enabled. The UE capability may be an incremental capability that is applicable to a UE supporting a full and/or partial overlapping in the time domain and a full overlapping in the frequency domain, or to a UE supporting a full/partial overlapping in the time domain and a partial overlapping in the frequency domain. When the UE declares such a capability to the network entity, the network entity may guarantee that co-scheduled PDSCHs have the same TDRA. The network entity may still select different FDRAs for co-scheduled PDSCHs.

Figure 9:
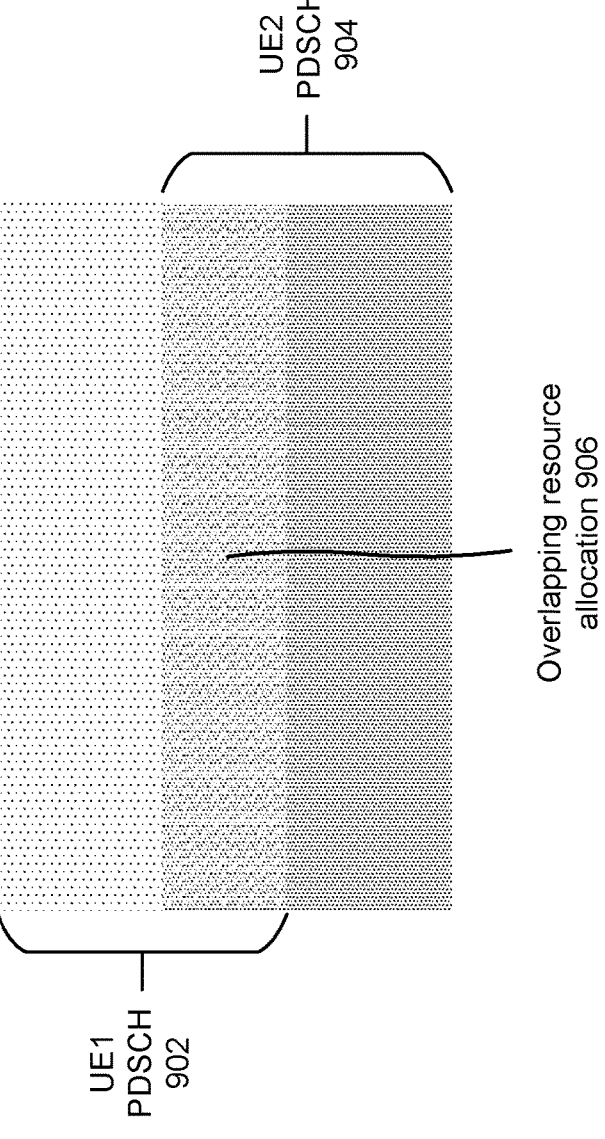

FIG. 9 is a diagram illustrating an example 900 associated with capability signaling for a multiple PDSCH scheduling in accordance with the present disclosure.

As shown in FIG. 9, a UE 1 PDSCH 902 and a UE 2 PDSCH 904 may be co-scheduled PDSCHs, which may be scheduled during an MU-MIMO PDSCH scheduling. The UE 1 PDSCH 902 and the UE 2 PDSCH 904 may be associated with the same TDRA, which may be based at least in part on a UE capability for MU-MIMO PDSCH scheduling with the same TDRA. A network entity may guarantee that the co-scheduled PDSCHs have the same TDRA. The UE 1 PDSCH 902 and the UE 2 PDSCH 904 may be associated with a different FDRA. For example, the UE 1 PDSCH 902 may partially overlap with the UE 2 PDSCH 904. An overlapping resource allocation 906 may be a region that is associated with both the UE 1 PDSCH 902 and the UE 2 PDSCH 904.

Figure 10:
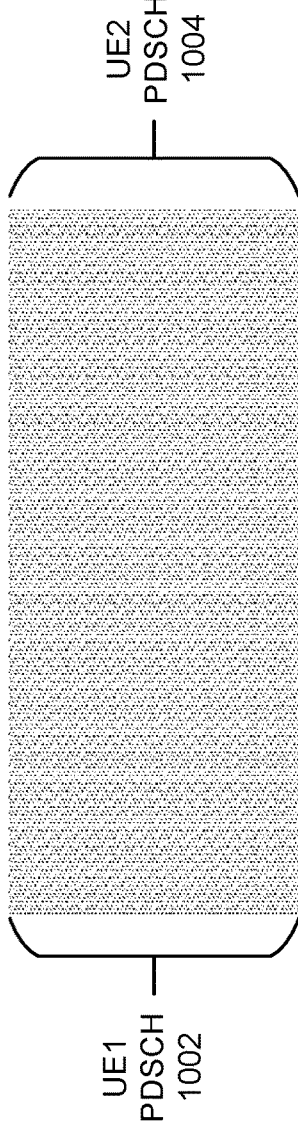

FIG. 10 is a diagram illustrating an example 1000 associated with capability signaling for a multiple PDSCH scheduling in accordance with the present disclosure.

As shown in FIG. 10, a UE 1 PDSCH 1002 and a UE 2 PDSCH 1004 may be co-scheduled PDSCHs, which may be scheduled during a MU-MIMO PDSCH scheduling. The UE 1 PDSCH 1002 and the UE 2 PDSCH 1004 may be associated with the same TDRA and with the same FDRA, which may be based at least in part on a UE capability for MU-MIMO PDSCH scheduling with the same TDRA and the same FDRA. A network entity may guarantee that the co-scheduled PDSCHs have the same TDRA and the same FDRA.

Figure 11:

FIG. 11 is a diagram illustrating an example 1100 associated with capability signaling for a multiple PDSCH scheduling in accordance with the present disclosure.

As shown in FIG. 11, a TRP 1 PDSCH 1102 and a TRP 2 PDSCH 1104 may be co-scheduled PDSCHs, which may be scheduled during a multi-DCI mTRP PDSCH scheduling. The TRP 1 PDSCH 1002 and the TRP 2 PDSCH 1004 may be associated with the same TDRA, which may be based at least in part on a UE capability for multi-DCI mTRP PDSCH scheduling with the same TDRA. A network entity may guarantee that the co-scheduled PDSCHs have the same TDRA. In this example, the TRP 1 PDSCH 1002 and the TRP 2 PDSCH 1004 may also be associated with the same FDRA. The TRP 1 PDSCH 1002 may fully overlap with the TRP 2 PDSCH 1004 in a frequency domain.

Figure 12:
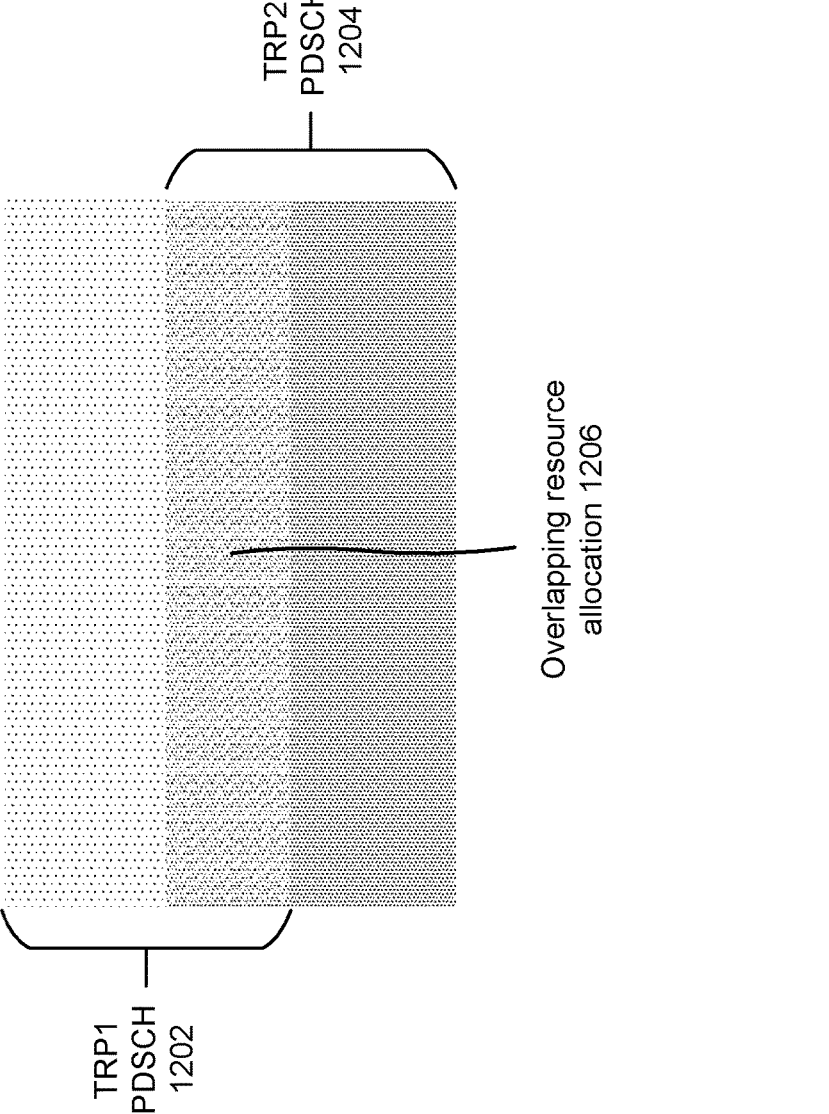

FIG. 12 is a diagram illustrating an example 1200 associated with capability signaling for a multiple PDSCH scheduling in accordance with the present disclosure.

As shown in FIG. 12, a TRP 1 PDSCH 1202 and a TRP 2 PDSCH 1204 may be co-scheduled PDSCHs, which may be scheduled during a multi-DCI mTRP PDSCH scheduling. The TRP 1 PDSCH 1202 and the TRP 2 PDSCH 1204 may be associated with the same TDRA, which may be based at least in part on a UE capability for multi-DCI mTRP PDSCH scheduling with the same TDRA. A network entity may guarantee that the co-scheduled PDSCHs have the same TDRA. The TRP 1 PDSCH 1202 and the TRP 2 PDSCH 1204 may be associated with a different FDRA. For example, the TRP 1 PDSCH 1202 may partially overlap with the TRP 2 PDSCH 1204. An overlapping resource allocation 1206 may be a region that is associated with both the TRP 1 PDSCH 1202 and the TRP 2 PDSCH 1204.

FIG. 13 is a flowchart illustrating an example process 1300 performed, for example, by a UE that supports wireless communication in accordance with the present disclosure. Example process 1300 is an example where the UE (for example, UE 120) performs operations associated with capability signaling for a multiple PDSCH scheduling.

As shown in FIG. 13, in some aspects, process 1300 may include transmitting, to a network entity, a capability signaling that indicates a UE capability for a multiple PDSCH scheduling being associated with one or more of a same TDRA or a same FDRA (block 1310). For example, the UE (such as by using transmission component 1504, depicted in FIG. 15) may transmit, to a network entity, a capability signaling that indicates a UE capability for a multiple PDSCH scheduling being associated with one or more of a same TDRA or a same FDRA, as described above.

As further shown in FIG. 13, in some aspects, process 1300 may include receiving, from the network entity, an indication of a scheduling of multiple PDSCHs, the multiple PDSCHs being associated with one or more of the same TDRA or the same FDRA based at least in part on the capability signaling (block 1320). For example, the UE (such as by using reception component 1502, depicted in FIG. 15) may receive, from the network entity, an indication of a scheduling of multiple PDSCHs, the multiple PDSCHs being associated with one or more of the same TDRA or the same FDRA based at least in part on the capability signaling, as described above.

Process 1300 may include additional aspects, such as any single aspect or any combination of aspects described below or in connection with one or more other processes described elsewhere herein.

In a first additional aspect, the multiple PDSCHs scheduled by the network entity are restricted to one or more of the same TDRA or the same FDRA based at least in part on the capability signaling.

In a second additional aspect, alone or in combination with the first aspect, the multiple PDSCH scheduling is a MU-MIMO PDSCH scheduling.

In a third additional aspect, alone or in combination with one or more of the first and second aspects, the capability signaling indicates that the UE is capable of being scheduled with MU-MIMO PDSCHs having the same TDRA, the MU-MIMO PDSCHs scheduled by the network entity in accordance with the MU-MIMO PDSCH scheduling are restricted to the same TDRA based at least in part on the capability signaling, and the MU-MIMO PDSCHs scheduled by the network entity in accordance with the MU-MIMO PDSCH scheduling are not restricted to the same FDRA based at least in part on the capability signaling.

In a fourth additional aspect, alone or in combination with one or more of the first through third aspects, the capability signaling indicates that the UE is capable of being scheduled with MU-MIMO PDSCHs having the same TDRA and the same FDRA, and the MU-MIMO PDSCHs scheduled by the network entity in accordance with the MU-MIMO PDSCH scheduling are restricted to the same TDRA and the same FDRA based at least in part on the capability signaling.

In a fifth additional aspect, alone or in combination with one or more of the first through fourth aspects, the multiple PDSCH scheduling is a multi-DCI mTRP PDSCH scheduling.

In a sixth additional aspect, alone or in combination with one or more of the first through fifth aspects, the capability signaling indicates that the UE is capable of being scheduled with multiple PDSCHs having the same TDRA, the multiple PDSCHs scheduled by the network entity in accordance with the multi-DCI mTRP PDSCH scheduling are restricted to the same TDRA based at least in part on the capability signaling, and the multiple PDSCHs scheduled by the network entity in accordance with the multi-DCI mTRP PDSCH scheduling are not restricted to the same FDRA based at least in part on the capability signaling.

In a seventh additional aspect, alone or in combination with one or more of the first through sixth aspects, the multiple PDSCHs include a first PDSCH and a second PDSCH.

In an eighth additional aspect, alone or in combination with one or more of the first through seventh aspects, the UE is a first UE, wherein the first PDSCH is associated with the first UE and the second PDSCH is associated with a second UE.

In a ninth additional aspect, alone or in combination with one or more of the first through eighth aspects, the first PDSCH is associated with a first TRP and the second PDSCH is associated with a second TRP.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

FIG. 14 is a flowchart illustrating an example process 1400 performed, for example, by a network entity that supports wireless communication in accordance with the present disclosure. Example process 1400 is an example where the network entity (for example, network node 110) performs operations associated with capability signaling for a multiple PDSCH scheduling.

As shown in FIG. 14, in some aspects, process 1400 may include receiving, from a UE, a capability signaling that indicates a UE capability for a multiple PDSCH scheduling being associated with one or more of a same TDRA or a same FDRA (block 1410). For example, the network entity (such as by using reception component 1602, depicted in FIG. 16) may receive, from a UE, a capability signaling that indicates a UE capability for a multiple PDSCH scheduling being associated with one or more of a same TDRA or a same FDRA, as described above.

As further shown in FIG. 14, in some aspects, process 1400 may include transmitting, to the UE, an indication of a scheduling of multiple PDSCHs, the multiple PDSCHs being associated with one or more of the same TDRA or the same FDRA based at least in part on the capability signaling (block 1420). For example, the network entity (such as by using transmission component 1604, depicted in FIG. 16) may transmit, to the UE, an indication of a scheduling of multiple PDSCHs, the multiple PDSCHs being associated with one or more of the same TDRA or the same FDRA based at least in part on the capability signaling, as described above.

Process 1400 may include additional aspects, such as any single aspect or any combination of aspects described below or in connection with one or more other processes described elsewhere herein.

In a first additional aspect, the multiple PDSCHs scheduled by the network entity are restricted to one or more of the same TDRA or the same FDRA based at least in part on the capability signaling.

In a second additional aspect, alone or in combination with the first aspect, the multiple PDSCH scheduling is an MU-MIMO PDSCH scheduling.

In a third additional aspect, alone or in combination with one or more of the first and second aspects, the capability signaling indicates that the UE is capable of being scheduled with MU-MIMO PDSCHs having the same TDRA, the MU-MIMO PDSCHs scheduled by the network entity in accordance with the MU-MIMO PDSCH scheduling are restricted to the same TDRA based at least in part on the capability signaling, and the MU-MIMO PDSCHs scheduled by the network entity in accordance with the MU-MIMO PDSCH scheduling are not restricted to the same FDRA based at least in part on the capability signaling.

In a fourth additional aspect, alone or in combination with one or more of the first through third aspects, the capability signaling indicates that the UE is capable of being scheduled with MU-MIMO PDSCHs having the same TDRA and the same FDRA. and the MU-MIMO PDSCHs scheduled by the network entity in accordance with the MU-MIMO PDSCH scheduling are restricted to the same TDRA and the same FDRA based at least in part on the capability signaling.

In a fifth additional aspect, alone or in combination with one or more of the first through fourth aspects, the multiple PDSCH scheduling is a multi-DCI mTRP PDSCH scheduling.

In a sixth additional aspect, alone or in combination with one or more of the first through fifth aspects, the capability signaling indicates that the UE is capable of being scheduled with multiple PDSCHs having the same TDRA, the multiple PDSCHs scheduled by the network entity in accordance with the multi-DCI mTRP PDSCH scheduling are restricted to the same TDRA based at least in part on the capability signaling, and the multiple PDSCHs scheduled by the network entity in accordance with the multi-DCI mTRP PDSCH scheduling are not restricted to the same FDRA based at least in part on the capability signaling.

In a seventh additional aspect, alone or in combination with one or more of the first through sixth aspects, the multiple PDSCHs include a first PDSCH and a second PDSCH.

In an eighth additional aspect, alone or in combination with one or more of the first through seventh aspects, the UE is a first UE, wherein the first PDSCH is associated with the first UE and the second PDSCH is associated with a second UE.

In a ninth additional aspect, alone or in combination with one or more of the first through eighth aspects, the first PDSCH is associated with a first TRP and the second PDSCH is associated with a second TRP.

Although FIG. 14 shows example blocks of process 1400, in some aspects, process 1400 may include additional blocks, fewer blocks, different blocks, or differently arranged blocks than those depicted in FIG. 14. Additionally or alternatively, two or more of the blocks of process 1400 may be performed in parallel.

Figure 15:
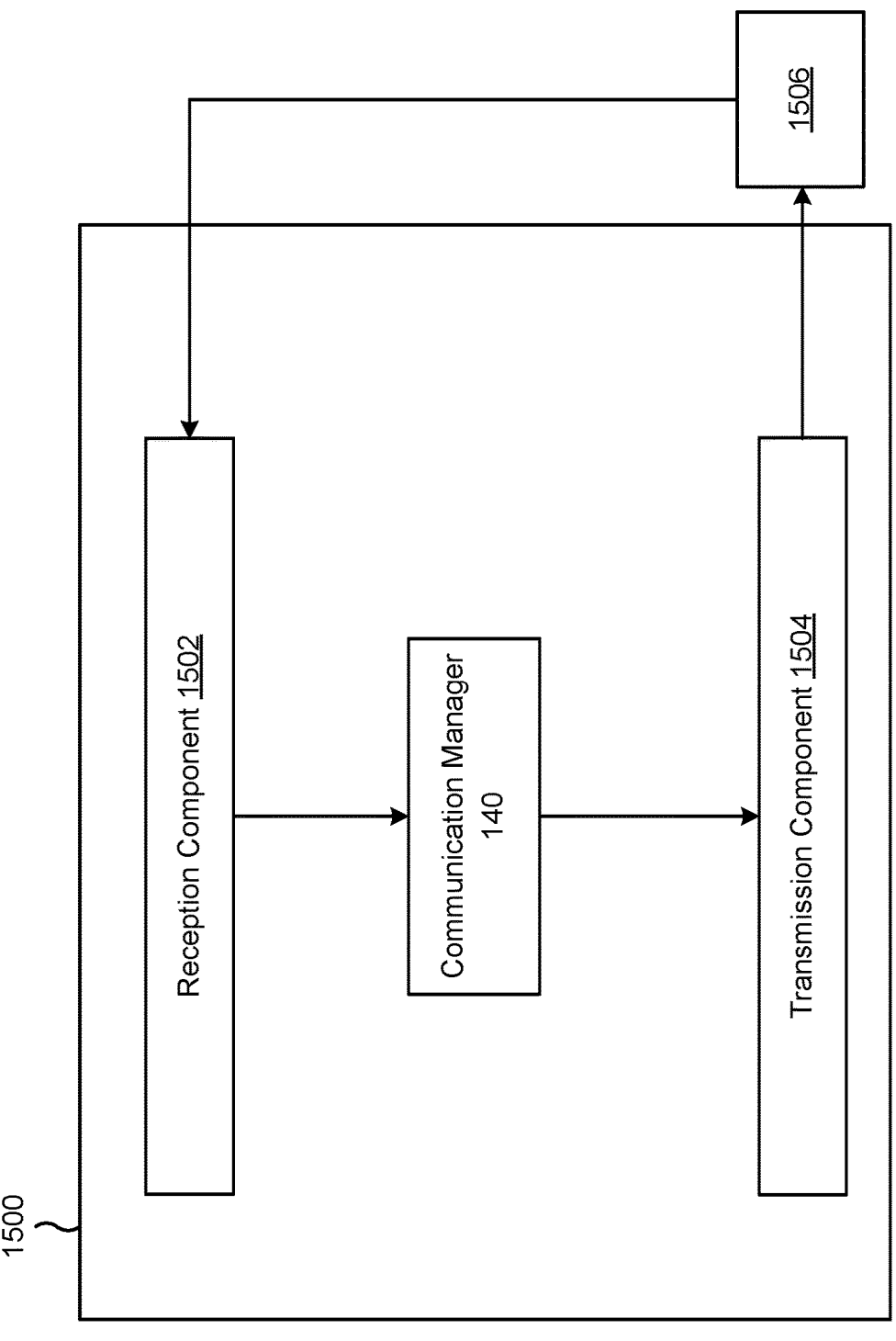
FIGS. 15-16 are diagrams of example apparatuses for wireless communication in accordance with the present disclosure.

FIG. 15 is a diagram of an example apparatus 1500 for wireless communication that supports capability signaling for a multiple PDSCH scheduling in accordance with the present disclosure. The apparatus 1500 may be a UE, or a UE may include the apparatus 1500. In some aspects, the apparatus 1500 includes a reception component 1502, a transmission component 1504, and a communication manager 140, which may be in communication with one another (for example, via one or more buses). As shown, the apparatus 1500 may communicate with another apparatus 1506 (such as a UE, a network node, or another wireless communication device) using the reception component 1502 and the transmission component 1504.

In some aspects, the apparatus 1500 may be configured to and/or operable to perform one or more operations described herein in connection with FIGS. 8-12. Additionally or alternatively, the apparatus 1500 may be configured to and/or operable to perform one or more processes described herein, such as process 1300 of FIG. 13. In some aspects, the apparatus 1500 may include one or more components of the UE described above in connection with FIG. 2.

The reception component 1502 may receive communications, such as reference signals, control information, and/or data communications, from the apparatus 1506. The reception component 1502 may provide received communications to one or more other components of the apparatus 1500, such as the communication manager 140. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a modem, a demodulator, a MIMO detector, a receive processor, a controller/processor, and/or a memory of the UE described above in connection with FIG. 2.

The transmission component 1504 may transmit communications, such as reference signals, control information, and/or data communications, to the apparatus 1506. In some aspects, the communication manager 140 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, and/or a memory of the UE described above in connection with FIG. 2. In some aspects, the transmission component 1504 may be co-located with the reception component 1502 in a transceiver.

The communication manager 140 may transmit or may cause the transmission component 1504 to transmit, to a network entity, a capability signaling that indicates a UE capability for a multiple PDSCH scheduling being associated with one or more of a same TDRA or a same FDRA. The communication manager 140 may receive or may cause the reception component 1502 to receive, from the network entity, an indication of a scheduling of multiple PDSCHs, the multiple PDSCHs being associated with one or more of the same TDRA or the same FDRA based at least in part on the capability signaling. In some aspects, the communication manager 140 may perform one or more operations described elsewhere herein as being performed by one or more components of the communication manager 140.

The communication manager 140 may include a controller/processor, and/or a memory of the UE described above in connection with FIG. 2. Alternatively, the set of components may be separate and distinct from the communication manager 140. In some aspects, one or more components of the set of components may include or may be implemented within a controller/processor, and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
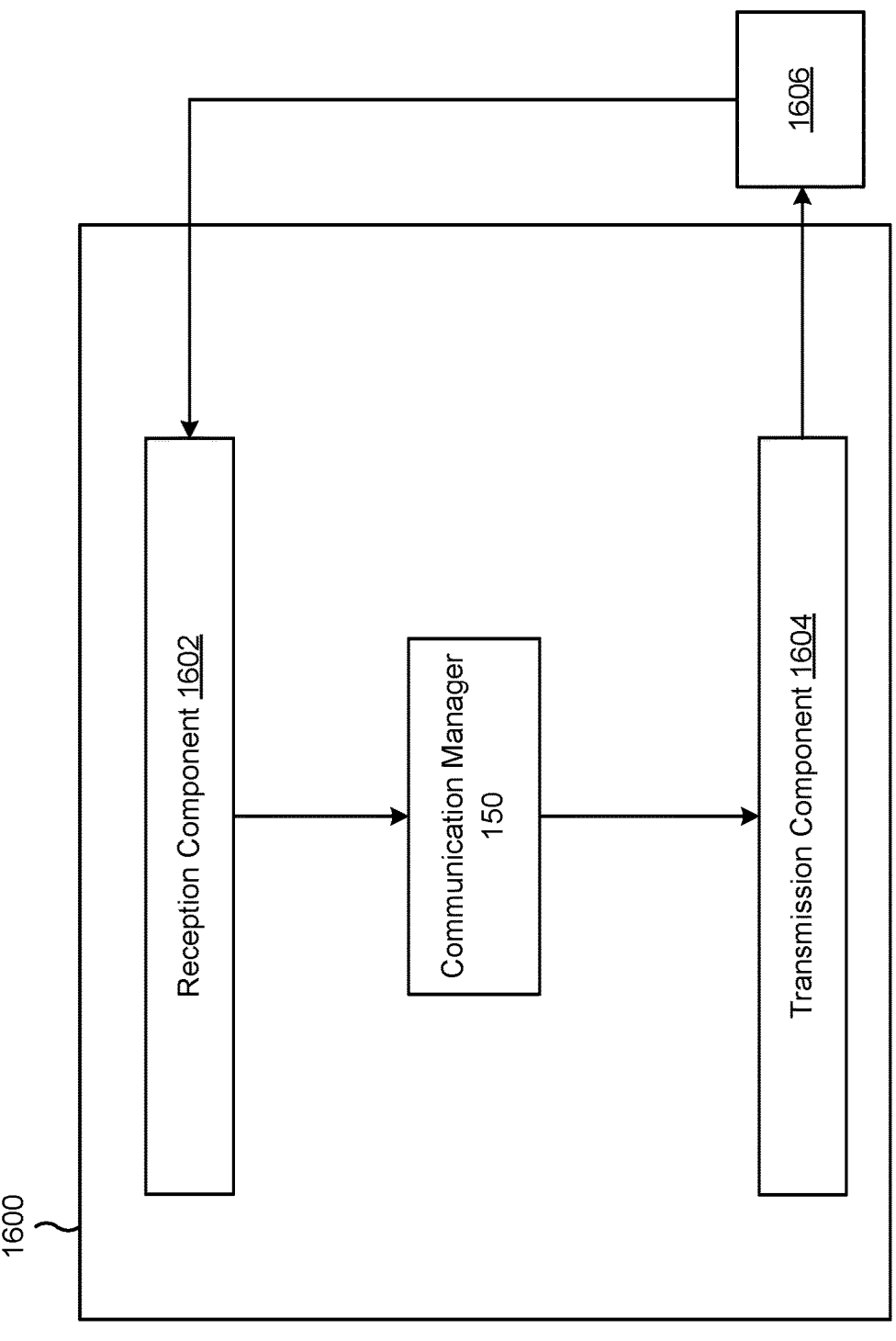

FIG. 16 is a diagram of an example apparatus 1600 for wireless communication that supports capability signaling for a multiple PDSCH scheduling in accordance with the present disclosure. The apparatus 1600 may be a network entity, or a network entity may include the apparatus 1600. In some aspects, the apparatus 1600 includes a reception component 1602, a transmission component 1604, and a communication manager 150, which may be in communication with one another (for example, via one or more buses). As shown, the apparatus 1600 may communicate with another apparatus 1606 (such as a UE, a network node, or another wireless communication device) using the reception component 1602 and the transmission component 1604.

In some aspects, the apparatus 1600 may be configured to and/or operable to perform one or more operations described herein in connection with FIGS. 8-12. Additionally or alternatively, the apparatus 1600 may be configured to and/or operable to perform one or more processes described herein, such as process 1400 of FIG. 14. In some aspects, the apparatus 1600 may include one or more components of the network entity described above in connection with FIG. 2.

The reception component 1602 may receive communications, such as reference signals, control information, and/or data communications, from the apparatus 1606. The reception component 1602 may provide received communications to one or more other components of the apparatus 1600, such as the communication manager 150. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a modem, a demodulator, a MIMO detector, a receive processor, a controller/processor, and/or a memory of the network entity described above in connection with FIG. 2.

The transmission component 1604 may transmit communications, such as reference signals, control information, and/or data communications, to the apparatus 1606. In some aspects, the communication manager 150 may generate communications and may transmit the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, and/or a memory of the network entity described above in connection with FIG. 2. In some aspects, the transmission component 1604 may be co-located with the reception component 1602 in a transceiver.

The communication manager 150 may receive or may cause the reception component 1602 to receive, from a UE, a capability signaling that indicates a UE capability for a multiple PDSCH scheduling being associated with one or more of a same TDRA or a same FDRA. The communication manager 150 may transmit or may cause the transmission component 1604 to transmit, to the UE, an indication of a scheduling of multiple PDSCHs, the multiple PDSCHs being associated with one or more of the same TDRA or the same FDRA based at least in part on the capability signaling. In some aspects, the communication manager 150 may perform one or more operations described elsewhere herein as being performed by one or more components of the communication manager 150.

The communication manager 150 may include a controller/processor, a memory, a scheduler, and/or a communication unit of the network entity described above in connection with FIG. 2. Alternatively, the set of components may be separate and distinct from the communication manager 150. In some aspects, one or more components of the set of components may include or may be implemented within a controller/processor, a memory, a scheduler, and/or a communication unit of the network entity described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: transmitting, to a network entity, a capability signaling that indicates a UE capability for a multiple physical downlink shared channel (PDSCH) scheduling being associated with one or more of a same time domain resource allocation (TDRA) or a same frequency domain resource allocation (FDRA); and receiving, from the network entity, an indication of a scheduling of multiple PDSCHs, the multiple PDSCHs being associated with one or more of the same TDRA or the same FDRA based at least in part on the capability signaling.

Aspect 2: The method of Aspect 1, wherein the multiple PDSCHs scheduled by the network entity are restricted to one or more of the same TDRA or the same FDRA based at least in part on the capability signaling.

Aspect 3: The method of any of Aspects 1-2, wherein the multiple PDSCH scheduling is a multiple user multiple-input multiple-output (MU-MIMO) PDSCH scheduling.

Aspect 4: The method of Aspect 3, wherein: the capability signaling indicates that the UE is capable of being scheduled with MU-MIMO PDSCHs having the same TDRA, the MU-MIMO PDSCHs scheduled by the network entity in accordance with the MU-MIMO PDSCH scheduling are restricted to the same TDRA based at least in part on the capability signaling, and the MU-MIMO PDSCHs scheduled by the network entity in accordance with the MU-MIMO PDSCH scheduling are not restricted to the same FDRA based at least in part on the capability signaling.

Aspect 5: The method of Aspect 3, wherein: the capability signaling indicates that the UE is capable of being scheduled with MU-MIMO PDSCHs having the same TDRA and the same FDRA, and the MU-MIMO PDSCHs scheduled by the network entity in accordance with the MU-MIMO PDSCH scheduling are restricted to the same TDRA and the same FDRA based at least in part on the capability signaling.

Aspect 6: The method of any of Aspects 1-5, wherein the multiple PDSCH scheduling is a multiple downlink control information (multi-DCI) multiple transmission reception point (mTRP) PDSCH scheduling.

Aspect 7: The method of Aspect 6, wherein: the capability signaling indicates that the UE is capable of being scheduled with multiple PDSCHs having the same TDRA, the multiple PDSCHs scheduled by the network entity in accordance with the multi-DCI mTRP PDSCH scheduling are restricted to the same TDRA based at least in part on the capability signaling, and the multiple PDSCHs scheduled by the network entity in accordance with the multi-DCI mTRP PDSCH scheduling are not restricted to the same FDRA based at least in part on the capability signaling.

Aspect 8: The method of any of Aspects 1-7, wherein the multiple PDSCHs include a first PDSCH and a second PDSCH.

Aspect 9: The method of Aspect 8, wherein the UE is a first UE, wherein the first PDSCH is associated with the first UE and the second PDSCH is associated with a second UE.

Aspect 10: The method of Aspect 8, wherein the first PDSCH is associated with a first transmission reception point (TRP) and the second PDSCH is associated with a second TRP.

Aspect 11: A method of wireless communication performed by a network entity, comprising: receiving, from a user equipment (UE), a capability signaling that indicates a UE capability for a multiple physical downlink shared channel (PDSCH) scheduling being associated with one or more of a same time domain resource allocation (TDRA) or a same frequency domain resource allocation (FDRA); and transmitting, to the UE, an indication of a scheduling of multiple PDSCHs, the multiple PDSCHs being associated with one or more of the same TDRA or the same FDRA based at least in part on the capability signaling.

Aspect 12: The method of Aspect 11, wherein the multiple PDSCHs scheduled by the network entity are restricted to one or more of the same TDRA or the same FDRA based at least in part on the capability signaling.

Aspect 13: The method of any of Aspects 11-12, wherein the multiple PDSCH scheduling is a multiple user multiple-input multiple-output (MU-MIMO) PDSCH scheduling.

Aspect 14: The method of Aspect 13, wherein: the capability signaling indicates that the UE is capable of being scheduled with MU-MIMO PDSCHs having the same TDRA, the MU-MIMO PDSCHs scheduled by the network entity in accordance with the MU-MIMO PDSCH scheduling are restricted to the same TDRA based at least in part on the capability signaling, and the MU-MIMO PDSCHs scheduled by the network entity in accordance with the MU-MIMO PDSCH scheduling are not restricted to the same FDRA based at least in part on the capability signaling.

Aspect 15: The method of Aspect 13, wherein: the capability signaling indicates that the UE is capable of being scheduled with MU-MIMO PDSCHs having the same TDRA and the same FDRA, and the MU-MIMO PDSCHs scheduled by the network entity in accordance with the MU-MIMO PDSCH scheduling are restricted to the same TDRA and the same FDRA based at least in part on the capability signaling.

Aspect 16: The method of any of Aspects 11-15, wherein the multiple PDSCH scheduling is a multiple downlink control information (multi-DCI) multiple transmission reception point (mTRP) PDSCH scheduling.

Aspect 17: The method of Aspect 16, wherein: the capability signaling indicates that the UE is capable of being scheduled with multiple PDSCHs having the same TDRA, the multiple PDSCHs scheduled by the network entity in accordance with the multi-DCI mTRP PDSCH scheduling are restricted to the same TDRA based at least in part on the capability signaling, and the multiple PDSCHs scheduled by the network entity in accordance with the multi-DCI mTRP PDSCH scheduling are not restricted to the same FDRA based at least in part on the capability signaling.

Aspect 18: The method of any of Aspects 11-17, wherein the multiple PDSCHs include a first PDSCH and a second PDSCH.

Aspect 19: The method of Aspect 18, wherein the UE is a first UE, wherein the first PDSCH is associated with the first UE and the second PDSCH is associated with a second UE.

Aspect 20: The method of Aspect 18, wherein the first PDSCH is associated with a first transmission reception point (TRP) and the second PDSCH is associated with a second TRP.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor communicatively coupled with the at least one memory, the at least one processor operable to cause the UE to:

transmit a capability signaling that indicates a UE capability for a multiple physical downlink shared channel (PDSCH) scheduling being associated with one or more of a same time domain resource allocation (TDRA) or a same frequency domain resource allocation (FDRA); and receive an indication of a scheduling of multiple PDSCHs, the multiple PDSCHs being associated with one or more of the same TDRA or the same FDRA based at least in part on the capability signaling, wherein the multiple PDSCH scheduling is a multiple user multiple-input multiple-output (MU-MIMO) PDSCH scheduling, the capability signaling indicating that the UE is capable of being scheduled with MU-MIMO PDSCHS having the same TDRA, and wherein:

the MU-MIMO PDSCHs, scheduled by a network entity in accordance with the MU-MIMO PDSCH scheduling, are restricted to the same TDRA based at least in part on the capability signaling, and the MU-MIMO PDSCHs, scheduled by the network entity in accordance with the MU-MIMO PDSCH scheduling, are not restricted to the same FDRA based at least in part on the capability signaling; or the capability signaling indicates that the UE is capable of being scheduled with MU-MIMO PDSCHs having the same TDRA and the same FDRA, and the MU-MIMO PDSCHs, scheduled by the network entity in accordance with the MU-MIMO PDSCH scheduling, are restricted to the same TDRA and the same FDRA based at least in part on the capability signaling.

2. The UE of claim 1, wherein the multiple PDSCHs, scheduled by a network entity, are restricted to one or more of the same TDRA or the same FDRA based at least in part on the capability signaling.

3. A user equipment (UE) for wireless communication, comprising:

at least one memory; and at least one processor communicatively coupled with the at least one memory, the at least one processor operable to cause the UE to:

transmit a capability signaling that indicates a UE capability for a multiple physical downlink shared channel (PDSCH) scheduling being associated with one or more of a same time domain resource allocation (TDRA) or a same frequency domain resource allocation (FDRA); and receive an indication of a scheduling of multiple PDSCHs, the multiple PDSCHs being associated with one or more of the same TDRA or the same FDRA based at least in part on the capability signaling;

wherein the multiple PDSCH scheduling is a multiple downlink control information (multi-DCI) multiple transmission reception point (mTRP) PDSCH scheduling, and wherein:

the capability signaling indicates that the UE is capable of being scheduled with multiple PDSCHs having the same TDRA, the multiple PDSCHs, scheduled by a network entity in accordance with the multi-DCI mTRP PDSCH scheduling, are restricted to the same TDRA based at least in part on the capability signaling, and the multiple PDSCHs, scheduled by the network entity in accordance with the multi-DCI mTRP PDSCH scheduling, are not restricted to the same FDRA based at least in part on the capability signaling.

4. A user equipment (UE) for wireless communication, comprising:

at least one memory; and at least one processor communicatively coupled with the at least one memory, the at least one processor operable to cause the UE to:

transmit a capability signaling that indicates a UE capability for a multiple physical downlink shared channel (PDSCH) scheduling being associated with one or more of a same time domain resource allocation (TDRA) or a same frequency domain resource allocation (FDRA); and receive an indication of a scheduling of multiple PDSCHs, the multiple PDSCHs being associated with one or more of the same TDRA or the same FDRA based at least in part on the capability signaling;

wherein the multiple PDSCHs include a first PDSCH and a second PDSCH, and wherein the UE is a first UE, wherein the first PDSCH is associated with the first UE and the second PDSCH is associated with a second UE.

5. A network entity for wireless communication, comprising:

at least one memory; and at least one processor communicatively coupled with the at least one memory, the at least one processor operable to cause the network entity to:

receive a capability signaling that indicates a user equipment (UE) capability for a multiple physical downlink shared channel (PDSCH) scheduling being associated with one or more of a same time domain resource allocation (TDRA) or a same frequency domain resource allocation (FDRA); and transmit an indication of a scheduling of multiple PDSCHs, the multiple PDSCHs being associated with one or more of the same TDRA or the same FDRA based at least in part on the capability signaling, wherein the multiple PDSCH scheduling is a multiple user multiple-input multiple-output (MU-MIMO) PDSCH scheduling, the capability signaling indicating that the UE is capable of being scheduled with MU-MIMO PDSCHs having the same TDRA, and wherein:

the MU-MIMO PDSCHs, scheduled by the network entity in accordance with the MU-MIMO PDSCH scheduling, are restricted to the same TDRA based at least in part on the capability signaling, and the MU-MIMO PDSCHs, scheduled by the network entity in accordance with the MU-MIMO PDSCH scheduling, are not restricted to the same FDRA based at least in part on the capability signaling; or the capability signaling indicates that the UE is capable of being scheduled with MU-MIMO PDSCHs having the same TDRA and the same FDRA, and the MU-MIMO PDSCHs, scheduled by the network entity in accordance with the MU-MIMO PDSCH scheduling, are restricted to the same TDRA and the same FDRA based at least in part on the capability signaling.

6. The network entity of claim 5, wherein the multiple PDSCHs, scheduled by the network entity, are restricted to one or more of the same TDRA or the same FDRA based at least in part on the capability signaling.

7. A network entity for wireless communication, comprising:

at least one memory; and at least one processor communicatively coupled with the at least one memory, the at least one processor operable to cause the network entity to:

receive a capability signaling that indicates a user equipment (UE) capability for a multiple physical downlink shared channel (PDSCH) scheduling being associated with one or more of a same time domain resource allocation (TDRA) or a same frequency domain resource allocation (FDRA); and transmit an indication of a scheduling of multiple PDSCHs, the multiple PDSCHs being associated with one or more of the same TDRA or the same FDRA based at least in part on the capability signaling, wherein the multiple PDSCH scheduling is a multiple downlink control information (multi-DCI) multiple transmission reception point (mTRP) PDSCH scheduling, and wherein:

the capability signaling indicates that the UE is capable of being scheduled with multiple PDSCHs having the same TDRA, the multiple PDSCHs, scheduled by a network entity in accordance with the multi-DCI mTRP PDSCH scheduling, are restricted to the same TDRA based at least in part on the capability signaling, and the multiple PDSCHs, scheduled by the network entity in accordance with the multi-DCI mTRP PDSCH scheduling, are not restricted to the same FDRA based at least in part on the capability signaling.

8. A network entity for wireless communication, comprising:

at least one memory; and at least one processor communicatively coupled with the at least one memory, the at least one processor operable to cause the network entity to:

receive a capability signaling that indicates a user equipment (UE) capability for a multiple physical downlink shared channel (PDSCH) scheduling being associated with one or more of a same time domain resource allocation (TDRA) or a same frequency domain resource allocation (FDRA); and transmit an indication of a scheduling of multiple PDSCHs, the multiple PDSCHs being associated with one or more of the same TDRA or the same FDRA based at least in part on the capability signaling, wherein the multiple PDSCHs include a first PDSCH and a second PDSCH, and wherein the UE is a first UE, wherein the first PDSCH is associated with the first UE and the second PDSCH is associated with a second UE.

* * * * *